(12) United States Patent
Agiwal et al.

(10) Patent No.: US 10,917,879 B2
(45) Date of Patent: Feb. 9, 2021

(54) METHOD AND APPARATUS FOR ENHANCED CONTENTION BASED RANDOM ACCESS PROCEDURE

(71) Applicant: Samsung Electronics Co., Ltd., Suwon-si, Gyeonggi-do (KR)

(72) Inventors: Anil Agiwal, Suwon-si (KR); Youngbin Chang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/722,629

(22) Filed: Oct. 2, 2017

(65) Prior Publication Data

US 2018/0103465 A1 Apr. 12, 2018

Related U.S. Application Data

(60) Provisional application No. 62/405,555, filed on Oct. 7, 2016.

(51) Int. Cl.
*H04W 72/04* (2009.01)
*H04W 74/00* (2009.01)
(Continued)

(52) U.S. Cl.
CPC ..... *H04W 72/0413* (2013.01); *H04W 74/004* (2013.01); *H04W 74/006* (2013.01);
(Continued)

(58) Field of Classification Search
CPC ........... H04W 72/0413; H04W 74/004; H04W 74/0833; H04W 74/006; H04W 72/1278; H04W 48/12; H04W 74/0866; H04W 4/02
See application file for complete search history.

(56) References Cited

U.S. PATENT DOCUMENTS

2007/0165567 A1 7/2007 Tan et al.
2012/0082103 A1* 4/2012 Lin .................... H04W 74/085
370/329
(Continued)

FOREIGN PATENT DOCUMENTS

WO 2008/023943 A1 2/2008
WO 2009/093816 A1 7/2009

OTHER PUBLICATIONS

European Search Report dated Jul. 24, 2019, issued in European Application No. 17858728.3-1215/3508020.
(Continued)

*Primary Examiner* — Brian D Nguyen
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a user equipment (UE) for performing a random access (RA) procedure is provided. The method includes transmitting a first message including a RA preamble and a UE identifier (ID) to a base station (BS), and receiving a second message including a sequence index of the RA preamble from the BS.

14 Claims, 17 Drawing Sheets

(51) Int. Cl.
*H04W 74/08* (2009.01)
*H04W 4/02* (2018.01)
*H04W 48/12* (2009.01)
*H04W 72/12* (2009.01)

(52) U.S. Cl.
CPC .......... *H04W 74/0833* (2013.01); *H04W 4/02* (2013.01); *H04W 48/12* (2013.01); *H04W 72/1278* (2013.01); *H04W 74/0866* (2013.01)

(56) References Cited

U.S. PATENT DOCUMENTS

| | | | |
|---|---|---|---|
| 2012/0113938 A1* | 5/2012 | Larsson | H04W 74/008 370/329 |
| 2013/0083695 A1 | 4/2013 | Narasimha et al. | |
| 2014/0328309 A1* | 11/2014 | Comstock | H04W 72/082 370/329 |
| 2015/0319786 A1* | 11/2015 | Dinan | H04W 56/001 370/329 |
| 2015/0359003 A1 | 12/2015 | Kim et al. | |
| 2016/0227581 A1* | 8/2016 | Lee | H04B 7/2612 |
| 2016/0255616 A1* | 9/2016 | Martin | H04W 72/048 370/330 |
| 2016/0255652 A1 | 9/2016 | Noh et al. | |
| 2016/0255654 A1 | 9/2016 | Lin et al. | |
| 2016/0295613 A1* | 10/2016 | Wager | H04L 41/0813 |
| 2016/0330768 A1* | 11/2016 | Hu | H04W 74/006 |
| 2017/0019932 A1* | 1/2017 | Su | H04W 74/0833 |
| 2017/0118753 A9* | 4/2017 | Dinan | H04W 52/146 |
| 2018/0242367 A1* | 8/2018 | Kim | H04W 72/04 |
| 2019/0014464 A1* | 1/2019 | Kuge | H04W 28/06 |
| 2019/0239251 A1* | 8/2019 | Li | H04L 5/0053 |

OTHER PUBLICATIONS

3GPP TSG RAN WG1 Meeting #55. NTT DOCOMO: "Initial Access Procedure for Asymmetric Wider Bandwidth in LTE Advanced", 3GPP Draft; R1-084249 Initial Access Procedure, 3rd Generation Partnership Project (3GPP), Prague, Czech Republic, XP050317534. Published on Nov. 4, 2008. pp. 1-5.

* cited by examiner

METHOD AND APPARATUS FOR ENHANCED CONTENTION BASED RANDOM ACCESS PROCEDURE

CROSS-REFERENCE TO RELATED APPLICATION(S)

This application claims the benefit under 35 U.S.C. § 119(e) of a U.S. provisional application filed on Oct. 7, 2016 in the U.S. Patent and Trademark Office and assigned Ser. No. 62/405,555, the entire disclosure of which is hereby incorporated by reference.

TECHNICAL FIELD

The present disclosure relates to a method and an apparatus for a contention based random access (RA) procedure. More particularly, the present disclosure relates to a method and an apparatus for performing a two-step contention based RA procedure and fall back between two-step and four-step contention based RA procedures.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high speed data services, ultra-reliability and low latency applications and massive machine type communication.

In existing wireless communication system, such as LTE, random access (RA) procedure is used to achieve uplink (UL) time synchronization. RA procedure is used in LTE during initial access, handover, radio resource control (RRC) connection re-establishment procedure, positioning purpose, scheduling request transmission, secondary cell group (SCG) addition/modification and data or control information transmission in UL by non-synchronized user equipment (UE) in RRC_CONNECTED state. In LTE two types of RA procedure are defined: contention-based and contention-free.

A procedure for idle to connected state transition using contention-based RA (CBRA) procedure leads to a total delay of 29.5 transmit time intervals (TTIs). However, for the next generation radio access technology the idle to connected transition delay requirement is 10 ms. Therefore, a need exits for enhancing the CBRA procedure.

The above information is presented as background information only to assist with an understanding of the present disclosure. No determination has been made, and no assertion is made, as to whether any of the above might be applicable as prior art with regard to the present disclosure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method and system for converging a fifth generation (5G) communication system for supporting higher data rates beyond a fourth generation (4G) system.

In accordance with an aspect of the present disclosure, a method of a user equipment (UE) for performing a random access (RA) procedure is provided. The method includes transmitting a first message including a RA preamble and a UE identifier (ID) to a base station (BS), and receiving a second message including a sequence index of the RA preamble from the BS.

In accordance with another aspect of the present disclosure, a UE for performing a RA procedure is provided. The UE includes a transceiver and a controller. The transceiver is configured to receive signals from a BS, and transmit signals to the BS. The controller is configured to control the transceiver to transmit a first message including a RA preamble and a UE ID to the BS, and control the transceiver to receive a second message including a sequence index of the RA preamble from the BS.

In accordance with another aspect of the present disclosure, a method of a BS for performing a RA procedure is provided. The method includes receiving a first message including a RA preamble and a UE ID from a UE, and transmitting a second message including a sequence index of the RA preamble to the UE.

In accordance with another aspect of the present disclosure, a BS for performing a RA procedure is provided. The BS includes a transceiver and a controller. The transceiver is configured to receive signals from a UE, and transmit signals to the UE. The controller is configured to control to the transceiver to receive a first message including a RA preamble and a UE ID from the UE, and control to the transceiver to transmit a second message including a sequence index of the RA preamble to the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
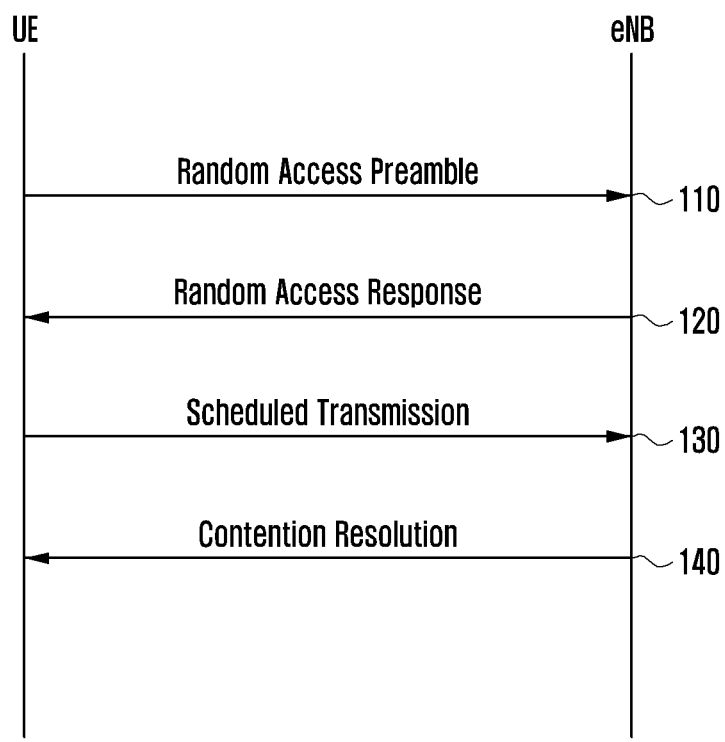
FIG. 1 illustrates a contention-based random access (CBRA) procedure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

FIG. 1 illustrates a contention-based random access (CBRA) procedure.

Referring to FIG. 1, a user equipment (UE) transmits a random access (RA) preamble to evolved node B (eNB) at operation 110.

The UE selects one of the available 64-Ncf contention based RA preambles. Ncf is the number of RA preambles reserved for contention free access. The contention based RA preambles can be optionally partitioned into two groups. If two groups are configured, the UE selects the group based on size of a message (i.e., MSG3) that the UE can transmit at operation 130. The initial RA preamble transmission power is set based on open loop estimation after compensating for path loss.

The ENB transmits a RA response (RAR) on physical downlink shared channel (PDSCH) addressed to RA-radio network temporary identifier (RA-RNTI) to the UE at operation 120.

The RA-RNTI identifies the time-frequency slot in which RA preamble was detected by eNB. RAR conveys RA preamble identifier (ID), timing alignment information, temporary cell-radio network temporary identifier (C-RNTI) and uplink (UL) grant for a message (i.e., MSG3) to be transmitted at operation 130. RAR may also include back off indicator to instruct the UE to back off for period of time before retrying RA attempt. RAR is transmitted in RAR window. RAR window starts at subframe 'x+3' for RA preamble transmitted in subframe 'x'. RAR window size is configurable.

The UE performs scheduled UL transmission on UL shared channel (UL SCH) at operation 130.

A message, such as RRC Connection Request, RRC Connection Re-establishment request, RRC handover confirm, scheduling request, and the like, may be transmitted at operation 130. The message transmitted at operation 130 is commonly referred as MSG3. The message transmitted at operation 130 may include the UE identity, such as C-RNTI or system architecture evolution (SAE)-temporary mobile subscriber identity (S-TMSI) or a random number. Hybrid automatic repeat request (HARQ) is used for the scheduled UL transmission.

The ENB transmits a contention resolution message at operation 140.

HARQ is used for transmission of a contention resolution message. A contention resolution message is addressed to C-RNTI (if C-RNTI is included in MSG3) or temporary C-RNTI (if the UE identity is included in MSG3). On successful decoding of the contention resolution message, HARQ feedback is only sent by the UE which detects its own UE ID (or C-RNTI).

Figure 2:
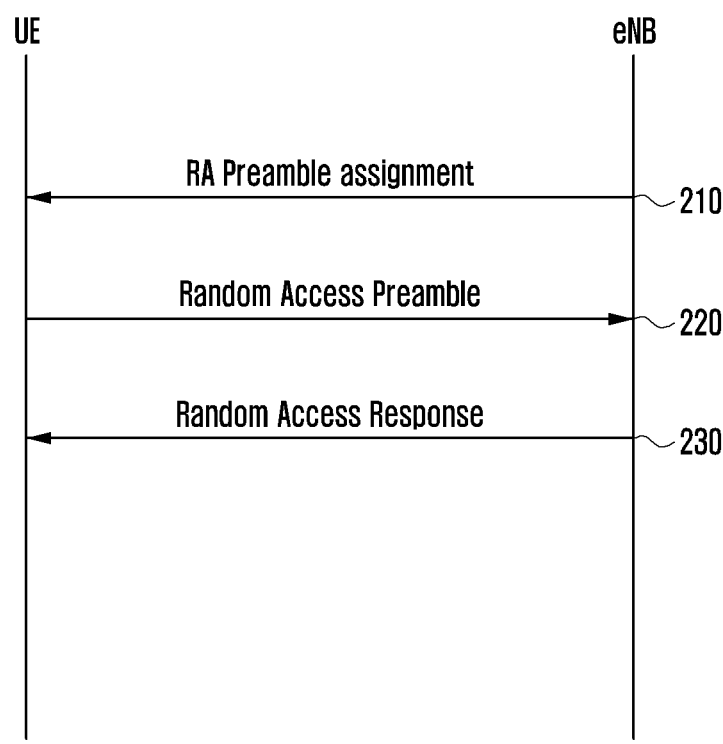
FIG. 2 illustrates a contention-free random access (CFRA) procedure.

FIG. 2 illustrates a contention-free RA (CFRA) procedure.

Referring to FIG. 2, contention free RA procedure is used for scenarios, such as handover where low latency is required, timing advance establishment for secondary cell (Scell), and the like.

The ENB assigns to the UE non-contention RA preamble in dedicated signaling at operation 210.

The UE transmits the assigned non-contention RA preamble at operation 220.

The ENB transmits the RAR on PDSCH addressed to RA-RNTI at operation 230. RAR conveys RA preamble ID and timing alignment information. RAR may also include UL grant. RAR is transmitted in RAR window similar to contention based RA procedure. Contention free RA procedure terminates after receiving the RAR.

Figure 3:
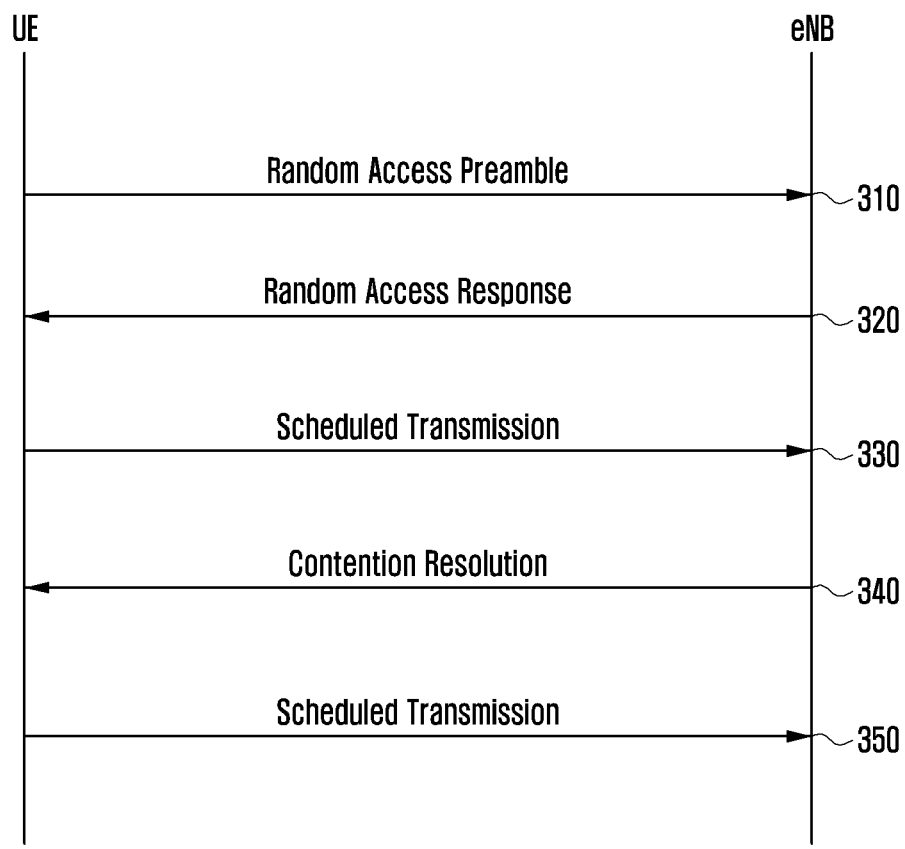
FIG. 3 illustrates a procedure for idle to connected state transition using a CBRA procedure.

FIG. 3 illustrates a procedure for idle to connected state transition using a CBRA procedure.

Referring to FIG. 3, the UE transmits an RA preamble to the eNB at operation 310, the eNB transmits a RAR on PDSCH addressed to RA-RNTI to the UE at operation 320, and the UE performs scheduled UL transmission on UL SCH at operation 330, similar to the CBRA procedure illustrated FIG. 1. The scheduled transmission in operation 330, i.e., MSG3 may refer to a connection request or a connection resume request.

The ENB transmits a contention resolution message at operation 340. The contention resolution message in operation 340 of FIG. 3 may refer to a connection setup (if a connection request is received at operation 330) or a connection resume (if a connection resume request is received at operation 330).

The UE performs scheduled transmission at operation 350. The scheduled transmission in operation 350 may refer to a connection setup complete (if a connection setup is received at operation 340) or a connection resume complete (if a connection resume is received at operation 340).

Meanwhile, the CBRA procedure leads to a total delay of 29.5 transmit time intervals (TTIs) as shown in Table 1 below.

TABLE 1

| Delay Calculation* | |
|---|---|
| Average delay due to RACH scheduling period (1 ms RACH cycle) | 0.5 |
| Transmission of RACH Preamble | 1 |
| Preamble detection and transmission of RA response (Time between the end RACH transmission and UE's reception of scheduling grant and timing adjustment) | 3 |
| UE Processing Delay (decoding of scheduling grant, timing alignment and C-RNTI assignment + L1 encoding of RRC Connection Request) | 5 |
| Transmission of MSG 3 | 1 |
| Processing delay in eNB | 4 |
| Transmission of MSG4 | 1 |
| Processing delay in UE | 12 |
| Transmission of MSG 5 | 1 |

For the next generation radio access technology the idle to connected transition delay requirement is 10 ms. So there is need to enhance the CBRA procedure.

Figure 4:
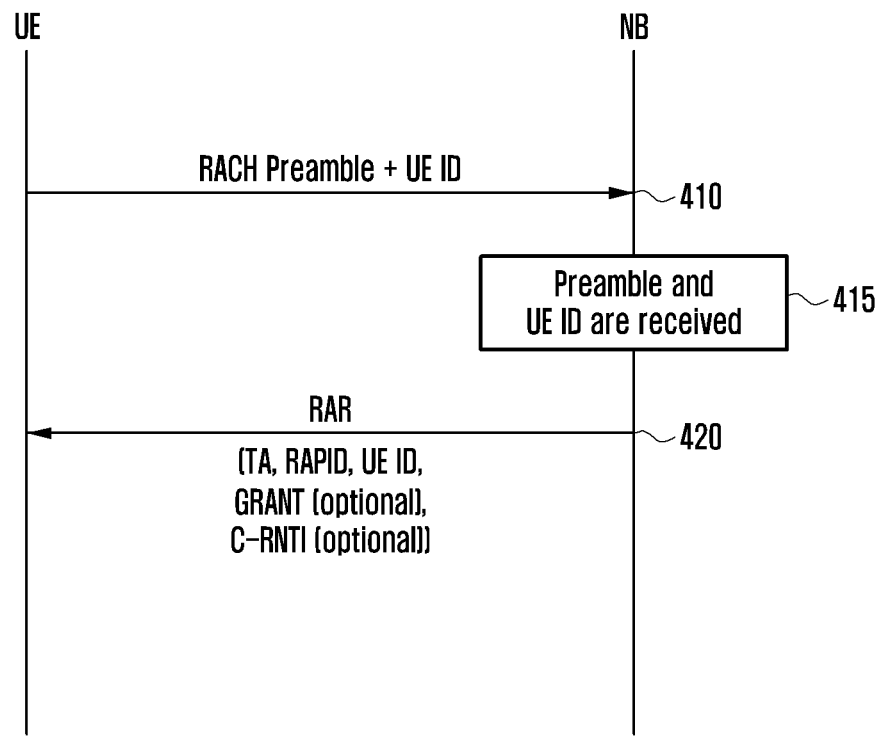
FIG. 4 illustrates a two-step contention based random access (RA) procedure according to an embodiment of the present disclosure.

FIG. 4 illustrates a two-step contention based RA procedure according to an embodiment of the present disclosure. In the procedure illustrated in FIG. 4, contention resolution is performed in two steps.

Referring to FIG. 4, the UE transmits a RA channel (RACH) preamble and a UE ID to a base station (BS) (e.g., node B (NB), eNB, or gNB) at operation 410. RACH preamble and UE ID can be transmitted in a single physical layer protocol data unit (PDU) or separate physical layer PDUs. The RACH preamble and the UE ID at operation 410 can be sent by UE in same time slot or different time slots. The operation 410 of transmitting RACH preamble and UE ID can be referred as MSG1 transmission. The UE ID can be at least one of Random ID, S-TMSI, C-RNTI, Resume ID, IMSI, idle mode ID, Inactive Mode ID, and the like. The UE ID can be different in different scenarios in which the UE performs the RA procedure. When the UE performs RA after power on (i.e., before the UE is attached to the network), the UE ID can be a random ID. Meanwhile, the UE may have a previously assigned or predetermined UE ID. For example, when the UE perform RA in IDLE state after the UE is attached the network the UE can use a previously assigned S-TMSI as the UE ID. If UE has an assigned C-RNTI (e.g., in connected state) the UE can use the C-RNTI as the UE ID. In case the UE is in INACTIVE state, the UE can use a resume ID as the UE ID.

NB determines whether NB has received the RACH preamble and the UE ID at operation 415.

If the NB has received both the RACH preamble and the UE ID, NB sends a RAR (also referred as MSG2) to the UE at operation 420. The RAR include at least one of timing advanced (TA), RACH preamble ID (RAPID) or the UE ID. The RAPID may refer to information on the received RACH preamble, e.g., a sequence index of the received RACH preamble. UE ID included in RAR is the UE ID received from UE. C-RNTI (or temporary C-RNTI) can be additionally included in RAR if the UE ID received from UE is not C-RNTI. Grant for UL transmission may also be included.

If physical downlink control channel (PDCCH) scheduling RAR is addressed to RA-RNTI corresponding to UE's RACH preamble transmitted at operation 410, RAPID received in RAR at operation 420 corresponds to UE's RACH preamble transmitted in operation 410, and the UE ID included in RAR is the UE ID transmitted by UE at operation 410, then the UE considers contention resolution as successful. Note that RA-RNTI is used to mask cyclic redundancy check (CRC) of PDCCH which schedules the RAR message. The RA-RNTI is specific to time and/or frequency resource in which RACH preamble is transmitted. The RAR message may include a RAPID.

Figure 5:
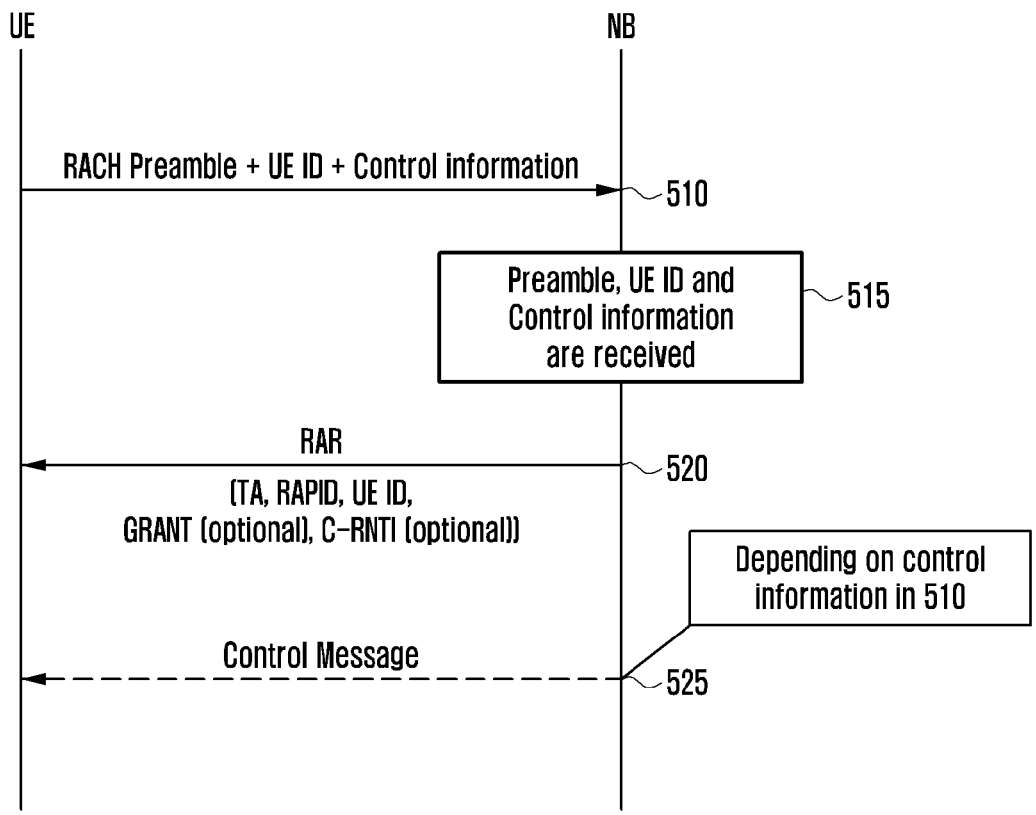
FIG. 5 illustrates an alternative two-step contention based RA procedure according to an embodiment of the present disclosure.

FIG. 5 illustrates an alternative two-step contention based RA procedure according to an embodiment of the present disclosure Referring to FIG. 5, the two-step contention based RA procedure illustrated in FIG. 5 is similar to that illustrated in FIG. 4 except that in addition to the UE ID some additional control information can be sent in operation 510. In other words, the UE transmits a RACH preamble, a UE ID, and control information to NB at operation 510. RACH preamble, UE ID and control information can be transmitted in a single physical layer PDU or separate physical layer PDUs. The RACH preamble, the UE ID and the control information at operation 510 can be sent by UE in same time slot or different time slots. The operation 510 of transmitting RACH preamble, UE ID and control information can also be referred as MSG1 transmission. The control information may include one or more of connection request indication, connection resume request indication, system information (SI) request indication, bitmap wherein each bit is mapped to SI message or system information block (SIB) requested by UE, buffer status indication, beam information (e.g., one or more DL TX beam ID(s)), data indicator, cell/BS/transmission reception point (TRP) switching indication, or connection re-establishment indication, and the like. Note that any other control information is not precluded.

NB determines whether NB has received the RACH preamble, the UE ID and control information at operation 515.

If RACH preamble, UE ID and control information is received, NB sends a RAR to the UE at operation 520. In addition, NB may transmit a control message based on the control information received at operation 510. In other words, NB may respond with a control message in addition to RAR message at operation 525. The control message may depend on control information received at operation 510. The RAR at operation 520 and the control message at operation 525 can be sent by NB in same time slot or different time slot.

Network can signal in dedicated or broadcast signaling the events or services for which UE should use two-step contention based random access procedure.

Figure 6A:
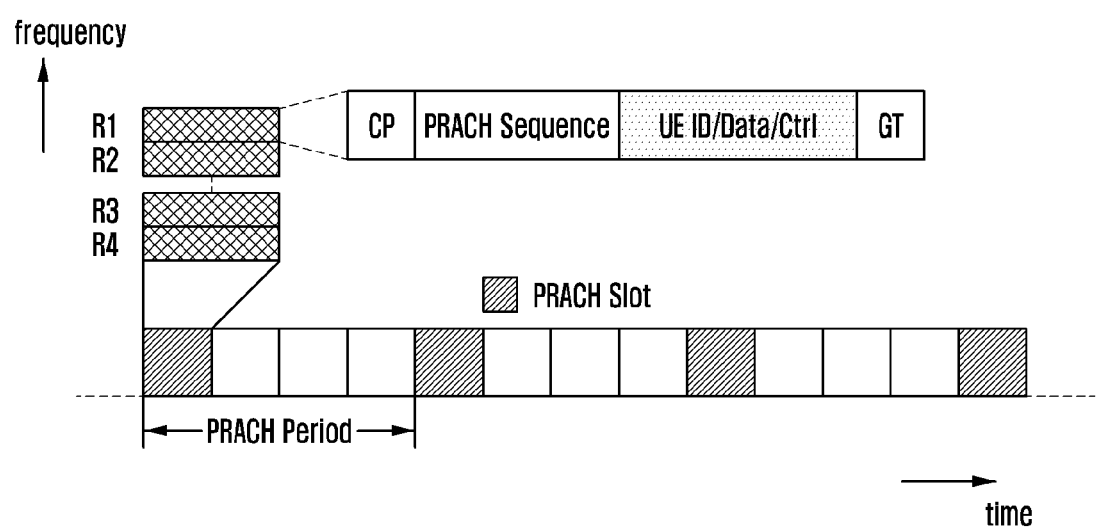
FIGS. 6A and 6B illustrate enhanced physical random access channel (PRACH) slot/resource formats for performing a two-step RA procedure according to various embodiments of the present disclosure.
Figure 6B:
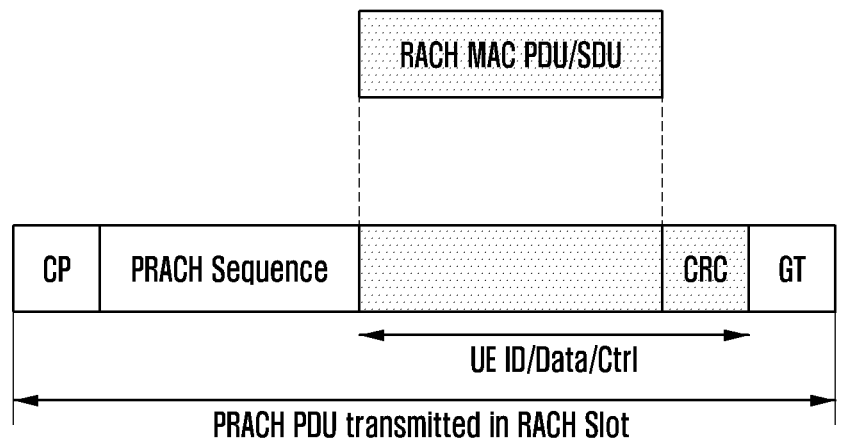

FIGS. 6A and 6B illustrate enhanced PRACH slot/resource formats for performing a two-step RA procedure according to various embodiments of the present disclosure.

Referring to FIGS. 6A and 6B, in a PRACH slot, the UE performs a PRACH transmission in a PRACH resource (e.g., R1 of FIG. 6A). In other words, the UE transmits a RA preamble in a PRACH resource on PRACH at first step of a two-step RA procedure (e.g., operation 410 of FIG. 4, operation 510 of FIG. 5). The PRACH format (i.e., RA preamble) for performing the PRACH transmission according to an embodiment of the present disclosure may include cyclic prefix (CP), PRACH preamble sequence, additional information (i.e., the UE ID, data, control information, CRC, and the like) and guard time (GT). In the system, there can be several PRACH formats wherein all PRACH format may not include additional information (i.e., the UE ID, data, control information, CRC, and the like) The PRACH format indicator in PRACH configuration may indicate the PRACH format to be used for PRACH configuration. In an embodiment of the present disclosure, NB may configure multiple PRACH configurations having PRACH formats which include additional information (i.e., the UE ID, data, control information, CRC, and the like) and which do not include additional information. The UE may choose PRACH configuration based on service/slice in which the UE is interested. For example, for ultra-reliable low latency (URLL) slice/service, the UE may use PRACH configuration which allows transmitting additional information. NB may also indicate which PRACH format to be used for which service/slice.

Figure 6C:
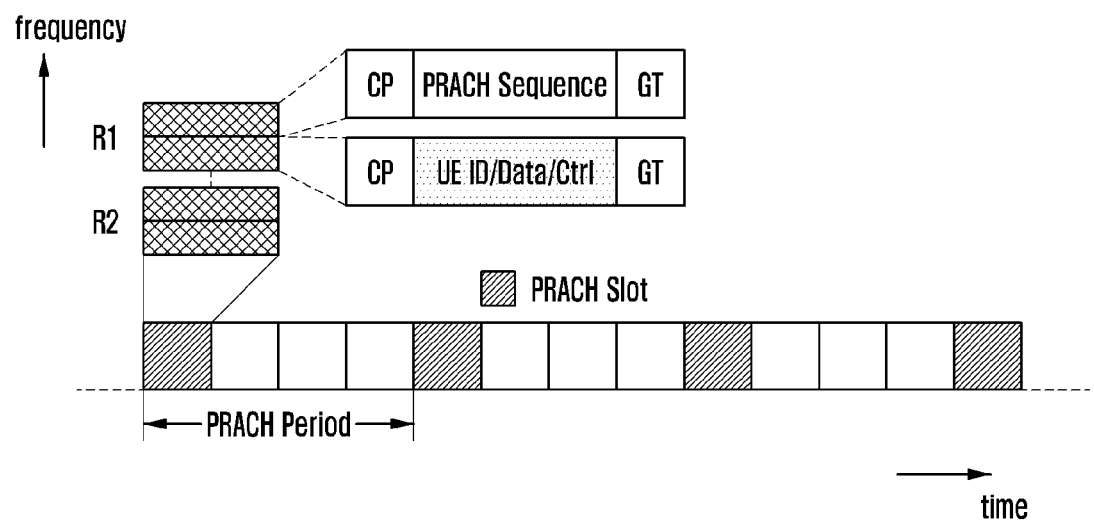
FIG. 6C illustrates an enhanced PRACH slot/resource format for performing a two-step RA procedure according to an embodiment of the present disclosure.

FIG. 6C illustrates an enhanced PRACH slot/resource format for performing a two-step RA procedure according to an embodiment of the present disclosure.

Referring to FIG. 6C, PRACH sequence and additional information (i.e., the UE ID, data, control information, CRC, and the like) are frequency division multiplexed in PRACH resources. PRACH format of FIG. 6C requires more resources because of additional CP and GT compared to PRACH format of FIG. 6A. However, duration of a slot of PRACH format of FIG. 6C is shorter, compared to that of FIG. 6B, which is beneficial in reducing latency.

Figure 6D:
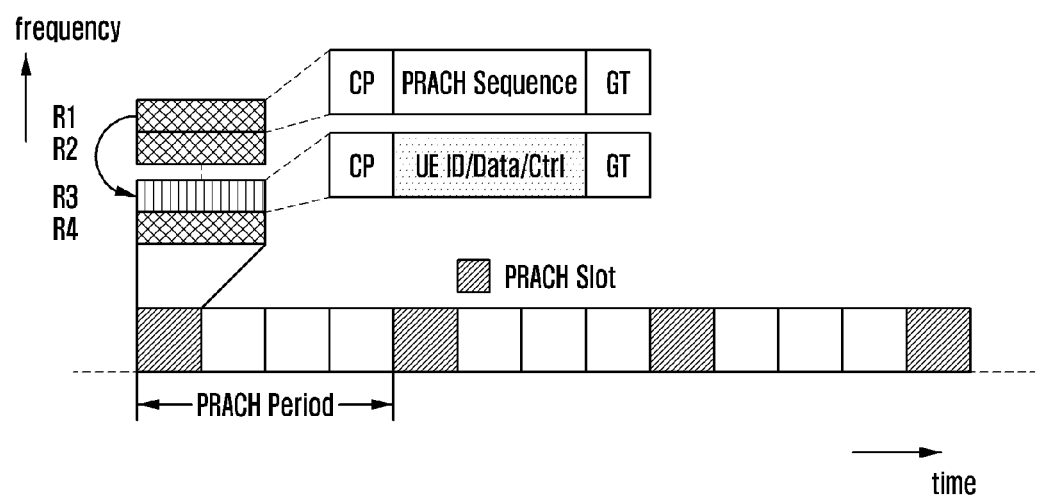
FIG. 6D illustrates an enhanced PRACH slot/resource format for performing a two-step RA procedure according to an embodiment of the present disclosure.

FIG. 6D illustrates an enhanced PRACH slot/resource format for performing a two-step RA procedure according to an embodiment of the present disclosure.

Referring to FIG. 6D, PRACH sequence and additional information (i.e., the UE ID, data, control information, CRC, and the like) are frequency division multiplexed in PRACH resource, similar to a PRACH format illustrated FIG. 6C. Furthermore, resource R1 for a PRACH sequence and resource R3 for additional information are separated. The PRACH configuration indicates resources for a PRACH sequence (i.e., PRACH resources) as well as resources for additional information. Mapping between resources for a PRACH sequence and resources for additional information can be implicit (e.g., first resource for a PRACH sequence maps to first resource for additional information, and so on) or can be explicitly indicated. For example, first resource is for a PRACH preamble and then next N (N can be 1)

resource(s) is for additional information, and so on. Since all UEs performing RA may not have to transmit additional information, separating resources for a PRACH preamble and resources for additional information can reduce contention on the resources for the additional information. There can be one to one mapping or one to many mapping between resources for a PRACH preamble and resource for additional information. In an embodiment of the present disclosure, only resources for a PRACH preamble are indicated, and resources for additional information can be pre-defined.

Figure 6E:
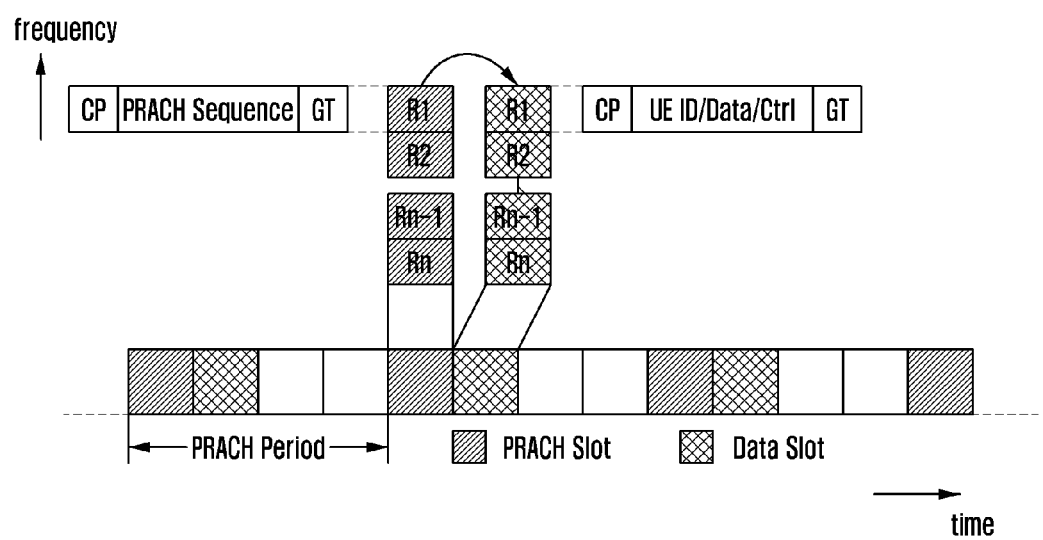
FIG. 6E illustrates an enhanced PRACH slot/resource format for performing a two-step RA procedure according to an embodiment of the present disclosure.

FIG. 6E illustrates an enhanced PRACH slot/resource format for performing a two-step RA procedure according to an embodiment of the present disclosure.

Referring to FIG. 6E, PRACH sequence and additional information (i.e., the UE ID, data, control information, CRC, and the like) are time division multiplexed. In other words, a slot for PRACH sequence (i.e., PRACH slot) and a slot for additional information (i.e., data slot) are different. A PRACH slot and a data slot may or may not be consecutive.

Meanwhile, it is possible that NB can only receive PRACH preamble and cannot decode additional information (i.e., the UE ID, data, control information, and the like) successfully. In an embodiment of the present disclosure, NB may not send RAR if only PRACH preamble is received and additional information is not received. But this is not efficient as the UE will again send RA preamble which leads to more delay. Therefore, in case only PRACH preamble is received and additional information is not successfully decoded, a two-step RA procedure may fall back to a four-step RA procedure according to an embodiment of the present disclosure. In the two-step to four-step fall back method, if only PRACH preamble is received and additional information cannot be successfully decoded, NB sends RAR including TA and RAPID. Temporary C-RNTI may also be included in the RAR. In addition, the RAR may include an indication that additional information is not decoded. NB may indicate that additional information is not decoded implicitly. For example, NB may transmit RAR without the UE ID and the absence of the UE ID in RAR may implicitly indicate that NB has only received RACH preamble. Alternatively, NB may indicate that additional information is not decoded explicitly. For example, NB may transmit one bit indication in RAR to indicate that only RACH preamble is received and additional information (e.g. UE ID) is not received.

Figure 7:
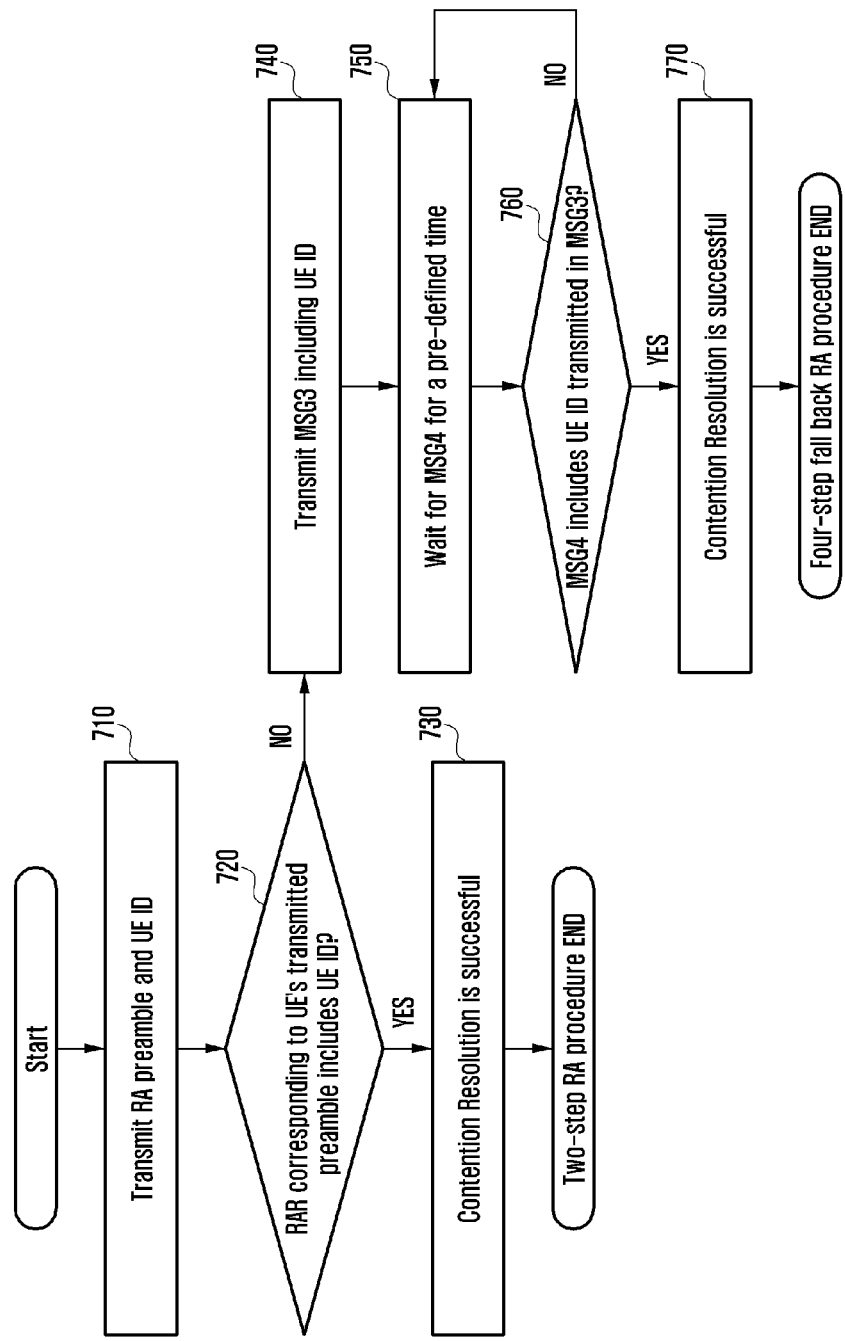
FIG. 7 illustrates a two-step to four-step fall back method for a RA according to an embodiment of the present disclosure.

FIG. 7 illustrates a two-step to four-step fall back method for a RA according to an embodiment of the present disclosure.

If the UE ID transmitted by UE to NB in MSG1 is not included in RAR (i.e., implicitly indicated) or there is an explicit indication in RAR that additional information (i.e., the UE ID, data, control information, and the like) is not decoded by NB, the UE falls back to a four-step RA procedure as shown in FIG. 7.

Referring to FIG. 7, the UE transmits MSG1 including RA preamble and additional information (i.e., the UE ID) to NB at operation 710. Additional information may also include data and control information.

If MSG1 is received, NB tries decoding additional information. If the additional information is successfully decoded, NB sends MSG2 (i.e., RAR) including the UE ID, as illustrated in FIGS. 4 and 5. If the additional information is not successfully decoded, NB sends RAR including UL grant. RAR also includes TA and RAPID. Temporary C-RNTI may also be included in the RAR.

If RAR corresponding to the UE's transmitted RA preamble is received, the UE determines whether RAR includes the UE ID at operation 720. Alternatively, the UE may determine whether RAR includes an indication that additional information (e.g., the UE ID) is received by NB. If RAR includes the UE ID or indicates that additional information is received, contention resolution is successful at operation 730 (i.e., two-step RA procedure END). Otherwise, the UE falls back to four-step procedure, i.e., the UE transmits MSG3 including at least the UE ID using the allocated grant at operation 740. Other information such as connection request or connection resume request or SI request and the like can also be transmitted in MSG3.

After transmitting MSG3, the UE waits for MSG4 for pre-defined time at operation 750. If MSG4 is received, the UE determines whether MSG4 includes the UE ID transmitted in MSG3 at operation 760. If MSG4 includes the UE ID, contention resolution is successful at operation 770 (i.e., four-step fall back RA procedure END). If MSG4 including UE ID transmitted in MSG3 is not received for pre-defined time UE retransmits MSG1.

Figure 8:
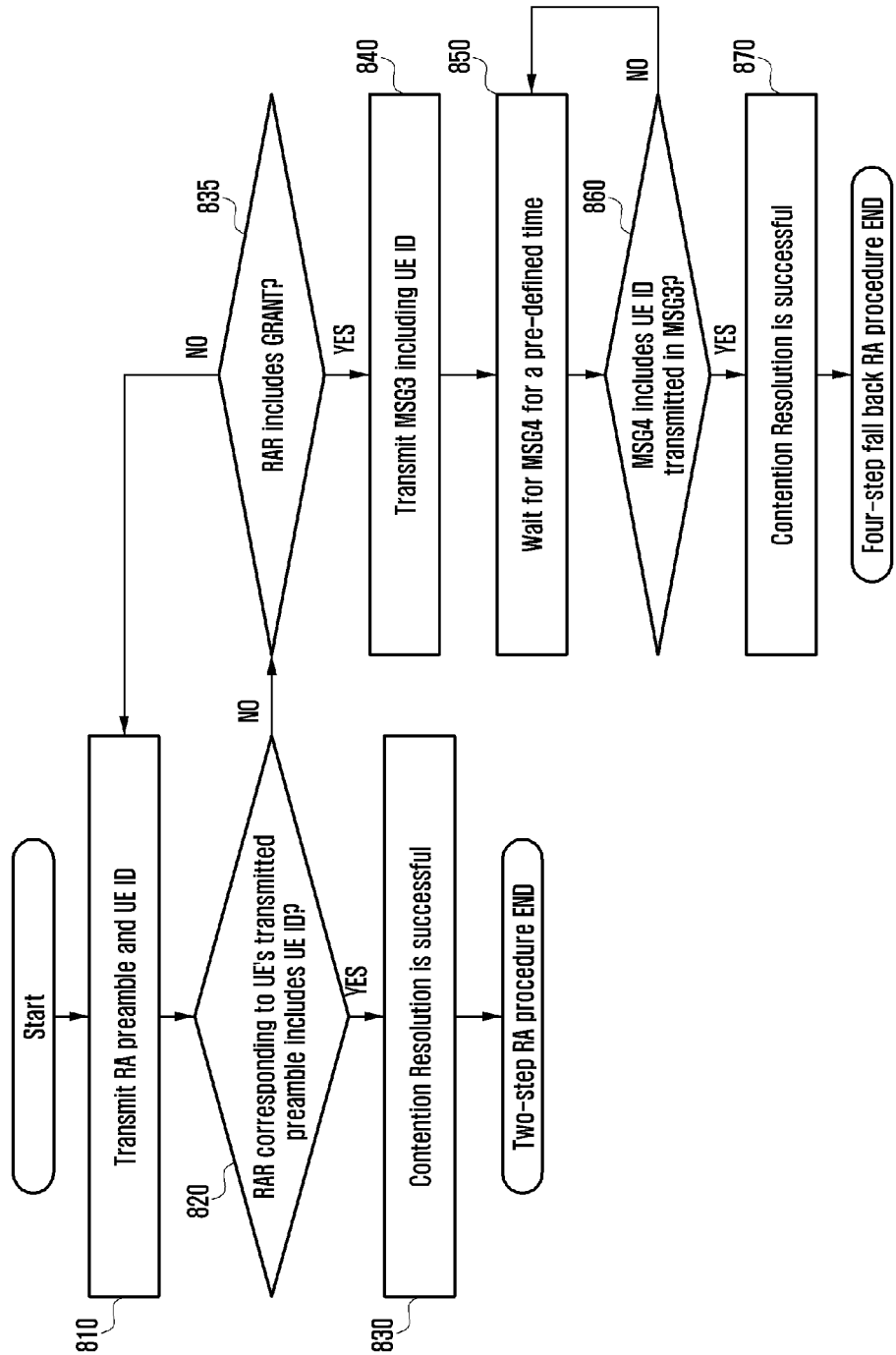
FIG. 8 illustrates an two-step to four-step fall back method for a RA according to an embodiment of the present disclosure.

FIG. 8 illustrates a two-step to four-step fall back method for a RA according to an embodiment of the present disclosure.

Referring to FIG. 8, similar to a two-step to four-step fall back method of FIG. 7, if the UE ID is not included in RAR (i.e., implicitly indicated) or there is an explicit indication in RAR that additional information (i.e., the UE ID, data, control information, and the like) is not decoded by NB, the UE falls back to a four-step RA procedure as shown in FIG. 8.

Specifically, similar to the method of FIG. 7, the UE transmits MSG1 including RA preamble and additional information (i.e., the UE ID, data, control information, and the like) to NB at operation 810. If MSG1 is received, NB tries decoding additional information. If the additional information is successfully decoded, NB sends MSG2 (i.e., RAR) including the UE ID, as illustrated in FIGS. 4 and 5. If the additional information is not successfully decoded, NB may determine whether to include grant in RAR. In other words, contrary to the method of FIG. 7, grant is not always included in RAR. If NB wants the UE to fall back to four-step procedure, NB includes grant in MSG2, otherwise NB does not include grant in RAR. RAR also includes TA and RAPID. Temporary C-RNTI may also be included in the RAR.

If RAR corresponding to the UE's transmitted RA preamble is received, the UE determines whether RAR includes the UE ID at operation 820. Alternatively, the UE may determine whether RAR includes an indication that additional information (e.g., the UE ID) is received by NB. If RAR includes the UE ID or indicates that additional information is received, contention resolution is successful at operation 830 (i.e., two-step RA procedure END).

If the UE ID is not included in RAR or there is an explicit indication in RAR that additional information (i.e., the UE ID, data, control information, and the like) is not decoded by NB, the UE determines whether grant is received in RAR at operation 835. If grant is not received in RAR, the UE retransmits RA preamble and the UE ID. If grant is received in RAR, the UE falls back to four-step procedure i.e., the UE transmits MSG3 including the UE ID using the allocated grant at operation 840. Other information such as connection request or connection resume request or SI request and the like can also be transmitted in MSG3.

After transmitting MSG3, the UE waits for MSG4 for pre-defined time at operation 850. If MSG4 is received, the UE determines whether MSG4 includes the UE ID transmitted in MSG3 at operation 860. If MSG4 includes the UE ID, contention resolution is successful at operation 870 (i.e., four-step fall back RA procedure END). If MSG4 including UE ID transmitted in MSG3 is not received for pre-defined time UE retransmits MSG1.

Figure 9:
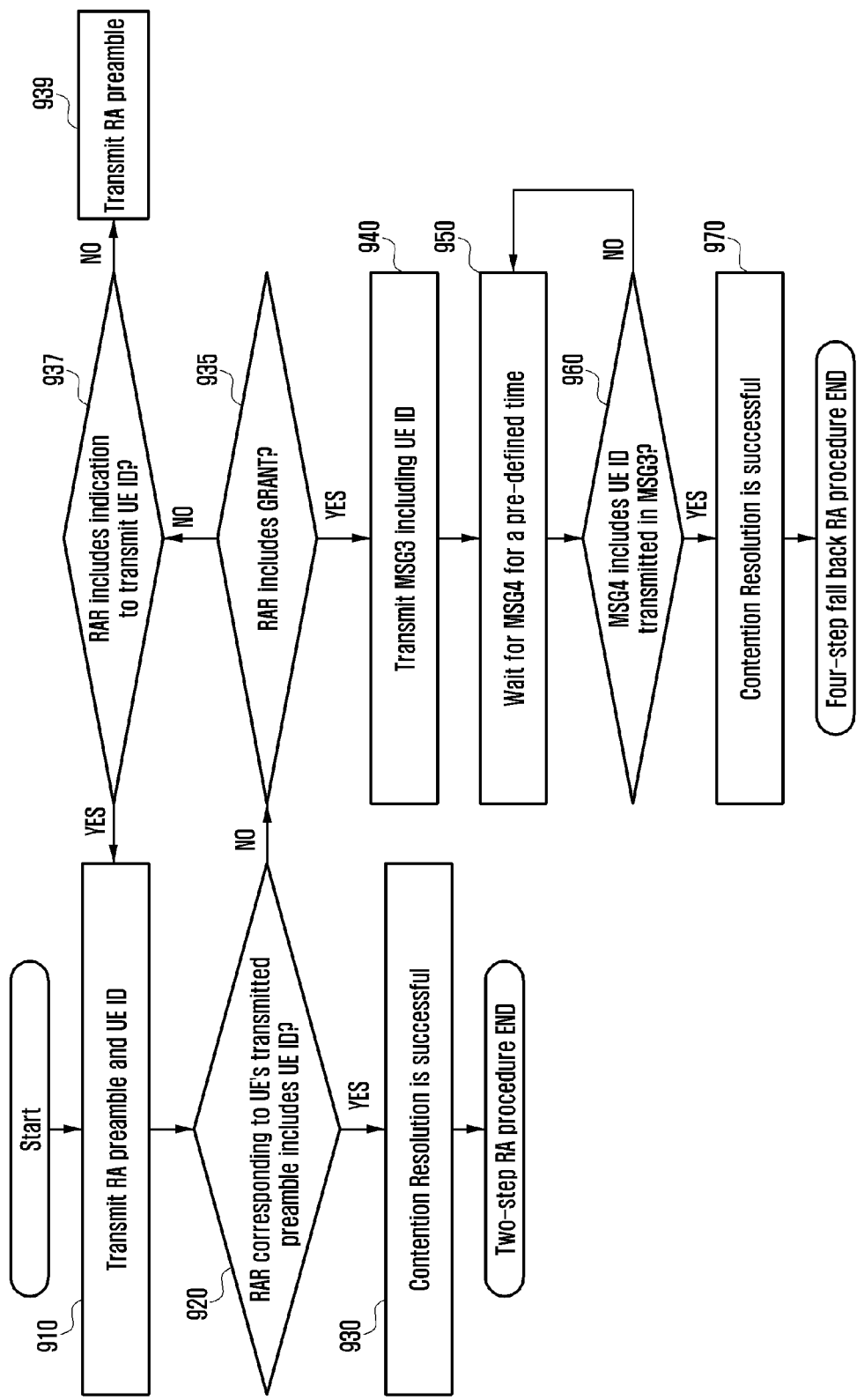
FIG. 9 illustrates an two-step to four-step fall back method for a random access according to an embodiment of the present disclosure.

FIG. 9 illustrates a two-step to four-step fall back method for an RA according to an embodiment of the present disclosure.

Referring to FIG. 9, similar to a two-step to four-step fall back methods of FIGS. 7 and 8, if the UE ID is not included in RAR (i.e., implicitly indicated) or there is an explicit indication in RAR that additional information (i.e., the UE ID, data, control information, and the like) is not decoded by NB, the UE falls back to a four-step RA procedure as shown in FIG. 9.

Specifically, similar to the methods of FIGS. 7 and 8, the UE transmits MSG1 including RA preamble and additional information (i.e., the UE ID, data, control information, and the like) to NB at operation 910. If MSG1 is received, NB tries decoding additional information. If the additional information is successfully decoded, NB sends MSG2 (i.e., RAR) including the UE ID, as illustrated in FIGS. 4 and 5. If the additional information is not successfully decoded, NB may determine whether to include grant in RAR. In other words, contrary to the method of FIG. 7, grant is not always included in RAR. Similar to the method of FIG. 8, if NB wants the UE to fall back to four-step procedure, NB includes grant in MSG2, otherwise NB does not include grant in RAR. In addition, NB may determine whether to include an indication to transmit the UE ID in RAR.

If RAR corresponding to the UE's transmitted RA preamble is received, the UE determines whether RAR includes the UE ID at operation 920. Alternatively, the UE may determine whether RAR includes an indication that additional information (e.g., the UE ID) is received by NB. If RAR includes the UE ID or indicates that additional information is received, contention resolution is successful at operation 930 (i.e., two-step RA procedure END). If the UE ID is not included in RAR or there is an explicit indication in RAR that additional information (i.e., the UE ID, data, control information, and the like) is not decoded by NB, the UE determines whether grant is received in RAR at operation 935. If grant is received in RAR, the UE falls backs to 4 step procedure i.e., the UE transmits MSG3 including the UE ID using the allocated grant at operation 940. Other information such as connection request or connection resume request or SI request and the like can also be transmitted in MSG3. After transmitting MSG3, the UE waits for MSG4 for pre-defined time at operation 950. If MSG4 is received, the UE determines whether MSG4 includes the UE ID transmitted in MSG3 at operation 960. If MSG4 includes the UE ID, contention resolution is successful at operation 970 (i.e., four-step fall back RA procedure END). If MSG4 including UE ID transmitted in MSG3 is not received for pre-defined time, the UE retransmits MSG1.

If grant is not received in RAR, the UE retransmits RA preamble. In addition, the UE may retransmit additional information (i.e., the UE ID, data, control information, and the like) while transmitting RA preamble based on indication from NB. Specifically, the UE may determine whether RAR includes indication to transmit additional information at operation 937. If RAR includes the indication, the UE retransmits MSG1 including both RA preamble and additional information, otherwise the UE retransmits MSG1 only including RA preamble at operation 939.

Figure 10:
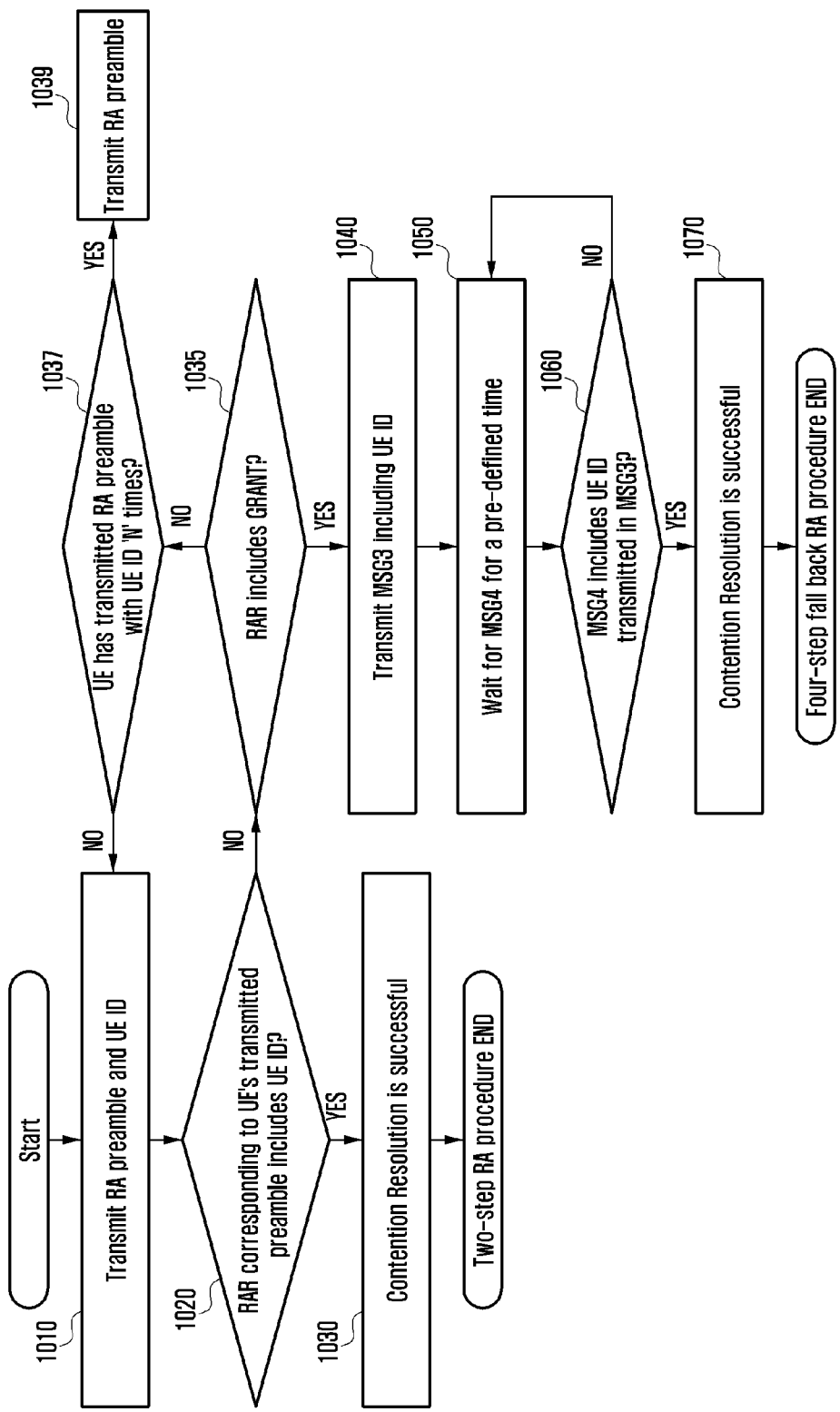
FIG. 10 illustrates an two-step to four-step fall back method for a RA according to an embodiment of the present disclosure.

FIG. 10 illustrates a two-step to four-step fall back method for a RA according to an embodiment of the present disclosure.

Referring to FIG. 10, similar to a two-step to four-step fall back methods of FIGS. 7, 8 and 9, if the UE ID is not included in RAR (i.e., implicitly indicated) or there is an explicit indication in RAR that additional information (i.e., the UE ID, data, control information, and the like) is not decoded by NB, the UE falls back to a four-step RA procedure as shown in FIG. 10.

Specifically, similar to the methods of FIGS. 7, 8, and 9, the UE transmits MSG1 including RA preamble and additional information (i.e., the UE ID, data, control information, and the like) to NB at operation 1010. If MSG1 is received, the NB tries decoding additional information. If the additional information is successfully decoded, NB sends MSG2 (i.e., RAR) including the UE ID, as illustrated in FIGS. 4 and 5. If the additional information is not successfully decoded, the NB may determine whether to include grant in RAR. In other words, contrary to the method of FIG. 7, grant is not always included in RAR. Similar to the methods of FIGS. 8 and 9, if NB wants the UE to fall back to four-step procedure, NB includes grant in MSG2, otherwise NB does not include grant in RAR.

If RAR corresponding to UE's transmitted PA preamble is received, the UE determines whether RAR includes the UE ID at operation 1020. Alternatively, the UE may determine whether RAR includes an indication that additional information (e.g., the UE ID) is received by NB. If RAR includes the UE ID or indicates that additional information is received, contention resolution is successful at operation 1030 (i.e., two-step RA procedure END). If the UE ID is not included in RAR or there is an explicit indication in RAR that additional information (i.e., the UE ID, data, control information, and the like) is not decoded by NB, the UE determines whether grant is received in RAR at operation 1035. If grant is received in RAR, the UE falls backs to 4 step procedure i.e., the UE transmits MSG3 including the UE ID using the allocated grant at operation 1040. Other information such as connection request or connection resume request or SI request and the like can also be transmitted in MSG3. After transmitting MSG3, the UE waits for MSG4 for pre-defined time at operation 1050. If MSG4 is received, the UE determines whether MSG4 includes the UE ID transmitted in MSG3 at operation 1060. If MSG4 includes the UE ID, contention resolution is successful at operation 1070 (i.e., four-step fall back RA procedure END). If MSG4 including UE ID transmitted in MSG3 is not received for pre-defined time UE retransmits MSG1.

If grant is not received in RAR, the UE retransmits RA preamble. In addition, the UE may retransmit additional information (i.e., the UE ID, data, control information, and the like) while transmitting RA preamble based on parameter 'N,' where parameter 'N' indicates the number of times the UE can retransmit additional information (i.e., the UE ID, data, control information, and the like) along with RA preamble. Specifically, the UE may determine whether the UE has transmitted RA preamble with the UE ID 'N' times at operation 1037. If the UE has transmitted RA preamble with the UE ID more than 'N' times, the UE retransmits MSG1 only including RA preamble at operation 1039. Parameter 'N' can be pre-defined or indicated by network in broadcast or dedicated signaling. Alternatively, parameter 'N' can be signaled along with PRACH configuration.

Figure 11:
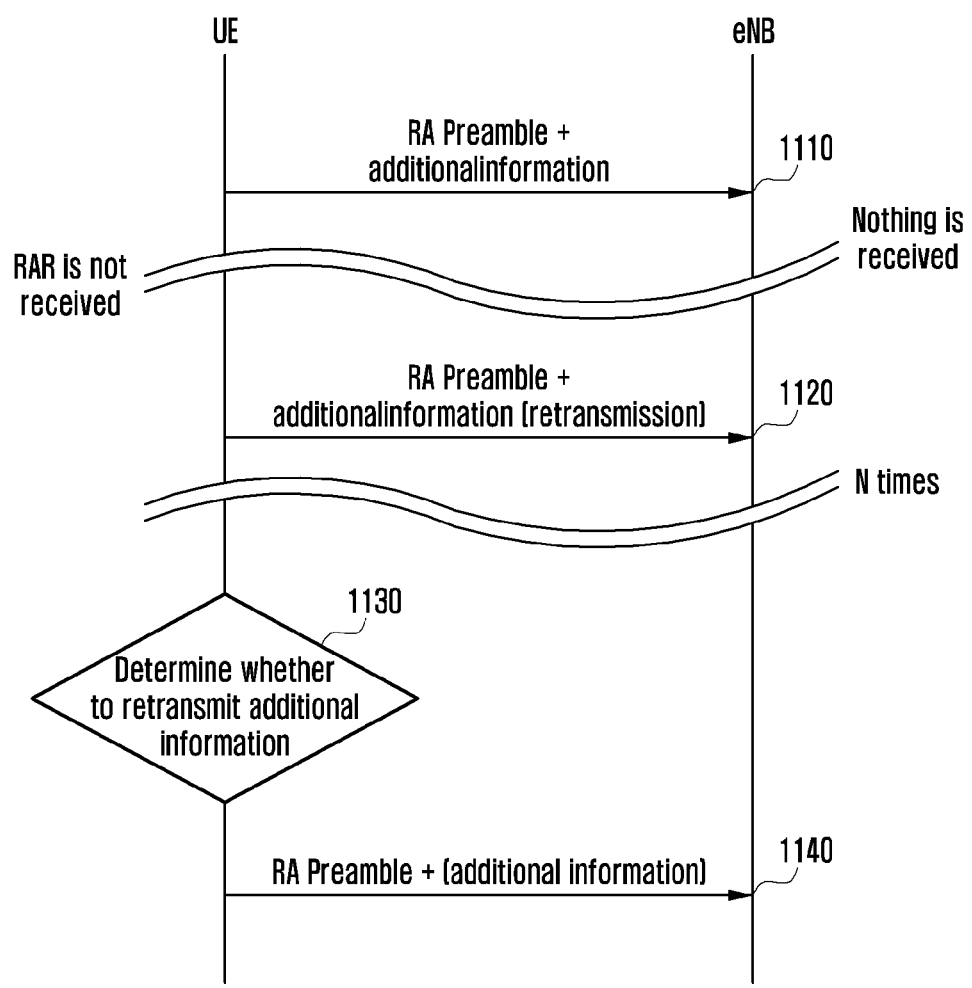
FIG. 11 illustrates an RA procedure when a user equipment (UE) does not receive an RA response (RAR) after transmitting RA preamble and additional information according to an embodiment of the present disclosure.

FIG. 11 illustrates an RA procedure when a UE does not receive a RAR after transmitting an RA preamble and additional information according to an embodiment of the present disclosure.

Referring to FIG. 11, if the UE does not receive RAR after transmitting MSG1 including RA preamble and additional information (i.e., the UE ID, data, control information, and the like), then in an embodiment of the present disclosure, the UE may retransmit MSG1 including RA preamble and additional information. In an alternate embodiment of the present disclosure, the UE may determine whether to retransmit additional information along with RA preamble or not. The UE can determine whether to retransmit additional information along with RA preamble based on parameter 'N,' where parameter 'N' indicates the number of times the UE can retransmit additional information along with RACH preamble. Parameter 'N' can be pre-defined or indicated by network in broadcast or dedicated signaling. Alternatively, parameter 'N' can be signaled along with PRACH configuration.

Referring to FIG. 11, the UE transmits MSG1 including RA preamble and additional information (i.e., the UE ID, data, control information, and the like) to NB at operation 1110. If nothing is received by NB, the NB does not transmit RAR to UE, and the UE cannot receive RAR. Therefore, the UE retransmits MSG1 including RA preamble and additional information to NB at operation 1120. Meanwhile, if the UE retransmits MSG1 including RA preamble and additional information several times but RAR is not received, the UE may determine whether to retransmit additional information along with RA preamble to NB at operation 1130. For example, the UE may determine whether to retransmit additional information along with RA preamble based on parameter 'N,' where parameter 'N' indicates the number of times the UE can retransmit additional information. Based on the determination, the UE may retransmit only RACH preamble, or both RACH preamble and additional information to the NB at operation 1140.

Figure 12:
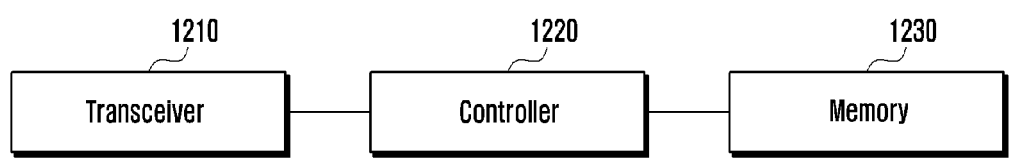
FIG. 12 is a block diagram of a UE for performing an RA procedure according to an embodiment of the present disclosure.

FIG. 12 is a block diagram of a UE for performing an RA procedure according to an embodiment of the present disclosure.

Referring to FIG. 12, the UE include a transceiver (1210), a controller (1220) and a memory (1230). The controller (1220) may refer to a circuitry, an application-specific integrated circuit (ASIC), or at least one processor. The transceiver (1210), the controller (1220) and the memory (1230) are configured to perform the operations of the UE in the RA procedure illustrated in FIGS. 4, 5, and 7 to 11 or described above. For example, the transceiver (1210) is configured to receive signals from a BS and transmit signals to the BS. The controller (1220) may be configured to control the transceiver (1210) to transmit a first message including a RA preamble and a UE ID to the BS, and control the transceiver (1210) to receive a second message including a sequence index of the RA preamble from the BS.

Figure 13:
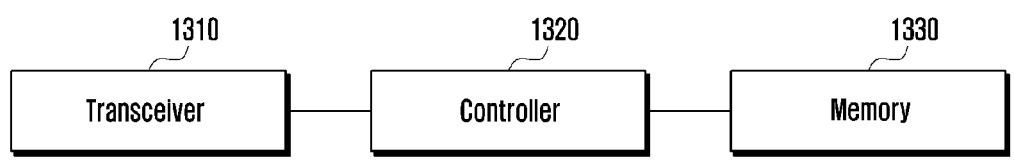
FIG. 13 is a block diagram of a base station (BS) for performing an RA procedure according to an embodiment of the present disclosure.

FIG. 13 is a block diagram of a BS for performing an RA procedure according to an embodiment of the present disclosure.

Referring to FIG. 13, the BS includes a transceiver (1310), a controller (1320) and a memory (1330). The controller (1320) may refer to a circuitry, an ASIC, or at least one processor. The transceiver (1310), the controller (1320) and the memory (1330) are configured to perform the operations of NB in the RA procedure illustrated in FIGS. 4, 5, and 7 to 11 or described above. For example, the transceiver (1310) is configured to receive signals from a UE, and transmit signals to the UE. The controller (1320) may be configured to control the transceiver (1310) to receive a first message including a RA preamble and a UE ID from the UE, and control the transceiver (1310) to transmit a second message including a sequence index of the RA preamble to the UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE) for performing a random access (RA) procedure, the method comprising:
   transmitting, to a base station (BS), an RA message including an RA preamble on a physical random access channel (PRACH), and a UE identifier (ID) and control information using a resource for data transmission; and
   receiving, from the BS, an RA response including the UE ID and a control message corresponding to the control information.

2. The method of claim 1, wherein the RA preamble, the UE ID and the control information are time division multiplexed in radio resources.

3. The method of claim 1, wherein the UE ID includes at least one of a random ID, a system architecture evolution (SAE)-temporary mobile subscriber identity (S-TMSI), a cell-radio network temporary identifier (C-RNTI), or a resume ID.

4. The method of claim 1, wherein the RA response further includes at least one of a cell-radio network temporary identifier (C-RNTI) or a timing advanced (TA) command.

5. A user equipment (UE) comprising:
   a transceiver configured to:
   receive signals from a base station (BS), and transmit signals to the BS; and
   at least one processor configured to:
   control the transceiver to transmit an RA message including a random access (RA) preamble on a physical random access channel (PRACH), and a UE identifier (ID) and control information using a resource for data transmission to the BS, and
   control the transceiver to receive an RA response including the UE ID and
   a control message corresponding to the control information from the BS.

6. The UE of claim 5, wherein the RA preamble, the UE ID and the control information are time division multiplexed in radio resources.

7. The UE of claim 5, wherein the UE ID includes at least one of a random ID, a system architecture evolution (SAE)-temporary mobile subscriber identity (S-TMSI), a cell-radio network temporary identifier (C-RNTI), or a resume ID.

8. The UE of claim 5, wherein the RA response further includes at least one of a cell-radio network temporary identifier (C-RNTI) or a timing advanced (TA) command.

9. A method of a base station (BS) for performing a random access (RA) procedure, the method comprising:
   receiving, from a user equipment (UE), an RA message including an RA preamble on a physical random access channel (PRACH), and a UE identifier (ID) and control information using a resource for data transmission; and
   transmitting, to the UE, an RA response including the UE ID and a control message corresponding to the control information to the UE.

10. The method of claim 9, wherein the UE ID includes at least one of a random ID, a system architecture evolution (SAE)-temporary mobile subscriber identity (S-TMSI), a cell-radio network temporary identifier (C-RNTI), or a resume ID.

11. The method of claim 9, wherein the RA response further includes at least one of a cell-radio network temporary identifier (C-RNTI) or a timing advanced (TA) command.

12. A base station (BS) for performing a random access (RA) procedure, the BS comprising:
  a transceiver configured to:
    receive signals from a user equipment (UE), and
    transmit signals to the UE; and
  at least one processor configured to:
    control to the transceiver to receive an RA message including an RA preamble on a physical random access channel (PRACH), a UE identifier (ID) and control information using a resource for data transmission from the UE, and
    control to the transceiver to transmit an RA response including the UE ID, and
    a control message corresponding to the control information to the UE.

13. The BS of claim 12, wherein the UE ID includes at least one of a random ID, a system architecture evolution (SAE)-temporary mobile subscriber identity (S-TMSI), a cell-radio network temporary identifier (C-RNTI), or a resume ID.

14. The BS of claim 12, wherein the RA response further includes at least one of a cell-radio network temporary identifier (C-RNTI) or a timing advanced (TA) command.

\* \* \* \* \*